United States Patent
Talmadge et al.

(10) Patent No.: US 6,876,296 B2
(45) Date of Patent: Apr. 5, 2005

(54) SMART LICENSE TAG SYSTEM

(75) Inventors: Samuel Talmadge, Agoura Hills, CA (US); Gregory A. Shreve, Huntsville, AL (US); Katherine E. MacQueen, Los Angeles, CA (US)

(73) Assignee: TRW Inc., Redondo Beach, CA (US)

(*) Notice: Subject to any disclaimer, the term of this patent is extended or adjusted under 35 U.S.C. 154(b) by 387 days.

(21) Appl. No.: 09/775,858

(22) Filed: Feb. 1, 2001

(65) Prior Publication Data

US 2002/0101332 A1 Aug. 1, 2002

(51) Int. Cl.⁷ .............................................. H04Q 5/22
(52) U.S. Cl. ............... 340/10.42; 340/10.1; 340/10.31; 340/539.1; 340/539.11; 340/5.8; 340/902; 342/42; 342/44; 342/51; 342/193; 455/41.2; 701/36
(58) Field of Search ....................... 340/10.42, 10.1, 340/539.1, 10.31, 539.11, 5.8, 902; 342/42, 44, 51, 193; 455/41.2; 701/36

(56) References Cited

U.S. PATENT DOCUMENTS

| | | | | |
|---|---|---|---|---|
| 4,001,822 A | * | 1/1977 | Sterzer | 342/44 |
| 4,779,076 A | | 10/1988 | Weaver | |
| 4,799,045 A | | 1/1989 | Fearon et al. | |
| 5,387,916 A | * | 2/1995 | Cohn | 342/44 |
| 5,506,584 A | * | 4/1996 | Boles | 342/42 |
| 6,121,892 A | * | 9/2000 | Reindl et al. | 340/5.8 |
| 6,388,579 B1 | * | 5/2002 | Adcox et al. | 340/902 |
| 6,480,699 B1 | * | 11/2002 | Lovoi | 455/41.2 |
| 2001/0002451 A1 | * | 5/2001 | Breed | 701/36 |

OTHER PUBLICATIONS

L. Reindl and W. Ruile, "Programmable Reflectors for SAW–ID–Tags," IEEE Ultrasonics Symp. Proc. 1993, pp. 125–130.

* cited by examiner

*Primary Examiner*—Ario Etienne
*Assistant Examiner*—Yves Dalencourt
(74) *Attorney, Agent, or Firm*—Tarolli, Sunheim, Covell & Tummino L.L.P.

(57) ABSTRACT

A system for providing the identification and tracking of motor vehicles that includes a probe device that transmits a radio frequency modulated signal to a transponder unit that is located within a vehicle registration tag of a vehicle. The transponder unit responds to the probe unit's request by transmitting its own radio frequency modulated signal containing any information requested by the probe device.

21 Claims, 3 Drawing Sheets

SMART LICENSE TAG SYSTEM

BACKGROUND OF THE INVENTION

1. Field of the Invention

The present invention relates generally to a radio frequency (RF) based communication system for providing the identification and tracking of motor vehicles, and more specifically to a vehicle identification and tracking system that is capable of integration into existing motor vehicle registration infrastructures.

2. Description of the Prior Art

As the volume of motor vehicle traffic increases, so too increases the number of traffic jams, accidents, fatalities and serious injuries to drivers. To overcome such concerns, various approaches to implementing Intelligent Transportation Systems (ITSs) have been proposed in the art. Generally, an ITS is a system which, by the combined use of sensors, radio frequency technology and computer systems, places transponders in vehicles and on the roadways to support operations that may include electronic toll collection, traffic control and demand management, driver information systems and collision avoidance.

There is no question that intelligent transportation systems can improve the experiences of drivers in many ways, however, given the many different implementations of such systems in the art, each utilizing different equipment, significant problems exist related to lack of uniformity and inter-operability across each of the systems. For example, a truck driver traveling from one geographical jurisdiction to another could potentially have to carry several different transponders on his or her vehicle in order to take advantage of the electronic toll collection stations located within various jurisdictions. Thus, in order that the functions of an ITS are optimally implemented, it is necessary that every vehicle having access to the system be compatible with the sensor and communication constructs used in the system infrastructure. In other words, part of the problem to be solved is that the vehicle-based equipment of an intelligent transportation system be universally operational over the entire population of vehicles on the road. Since, if the vehicle-based equipment were only installed in new vehicles, or if it were a retrofit installation at the option of the vehicle owner, even if the installation were free, the desired condition of universal inter-operability would practically never be met, taking many years to achieve even a 90% uniformity.

Moreover, an additional problem to be solved once an ITS system is in place is that of maintaining and upgrading the vehicle-based equipment. In other words, besides the need to have a very high percentage of the vehicle-based installations operational at all times, there is a need to upgrade the equipment as technology improves and more functions are required for incorporation into existing intelligent transportation systems. And notwithstanding the problems related to vehicle-based equipment uniformity and interoperability, there is also a need to expand the capabilities for ITS networks by providing methods to better sense and communicate with the vehicles that comprise the ITS network.

Thus, a radio frequency (RF) based smart tag system that exploits the use of existing motor vehicle registration tags to overcome the problems related to the uniformity and inter-operability of vehicle-based equipment and includes the capability to automatically identify vehicles, determine vehicle location, determine vehicle speed and direction and exchange data with vehicles is highly desirable.

SUMMARY OF THE INVENTION

The preceding and other shortcomings of the prior art are addressed and overcome by the present invention that provides a radio frequency (RF) based communication system for the identification and tracking of motor vehicles by using state of the art microelectronics and wireless technologies in the infrastructure of existing motor vehicle registration requirements. The system includes a probe for transmitting a modulated radio frequency (RF) request signal and receiving a modulated radio frequency (RF) response signal corresponding thereto. The system further includes a tag attached to a vehicle for displaying a registration of the vehicle. The tag, in addition to displaying vehicle registration information, has the capability to receive the modulated radio frequency (RF) request signal from the probe and transmit the modulated radio frequency (RF) response signal in response thereto so that, among other things, the probe can further identify the vehicle hosting the tag.

BRIEF DESCRIPTION OF THE DRAWINGS

Reference is now made to the following description and attached drawings, wherein.

DETAILED DESCRIPTION OF THE INVENTION

Figure 1:
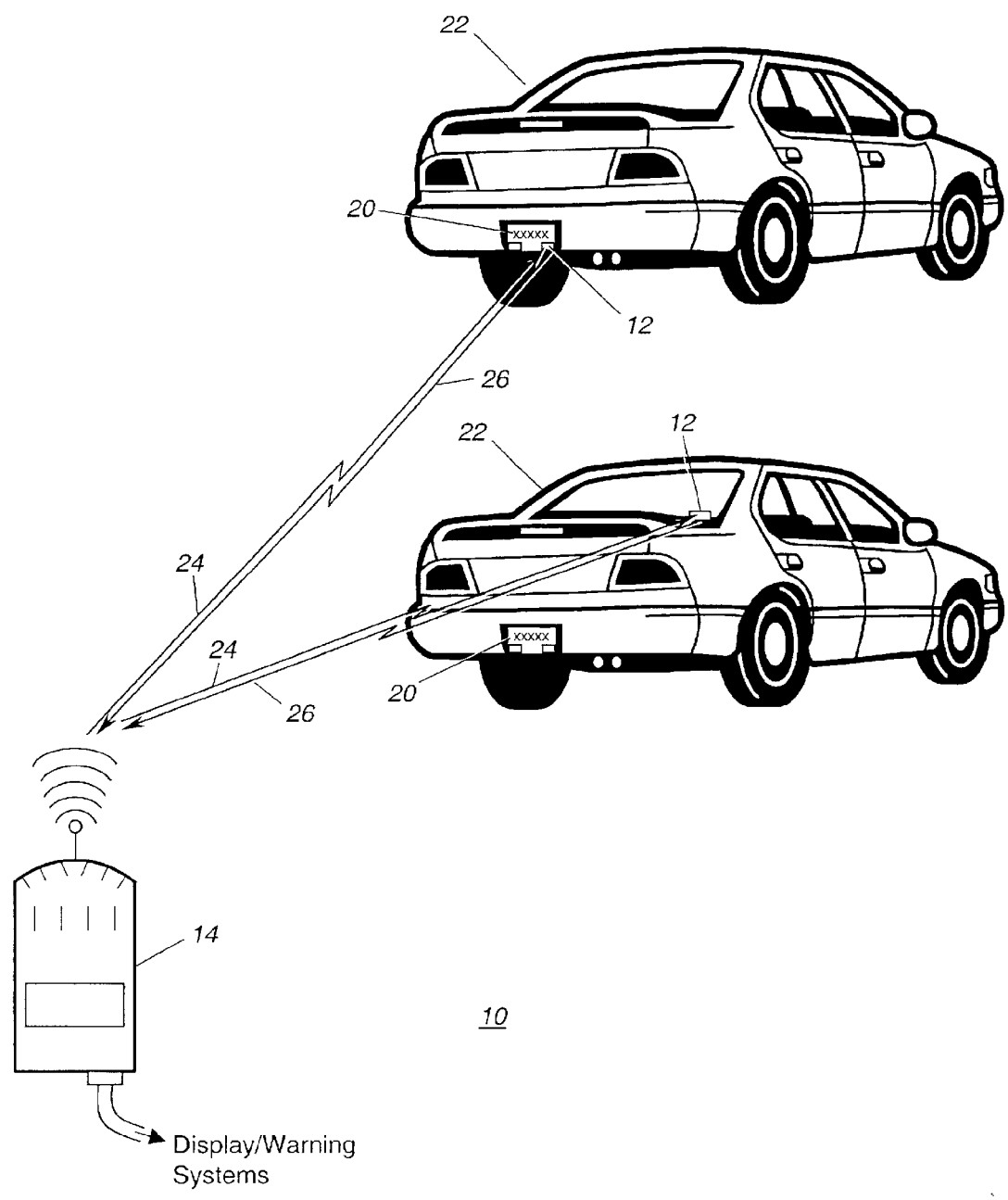
FIG. 1 is an functional diagram of a smart tag communication system in accordance with an embodiment of the present invention.

Referring to FIG. 1, an embodiment of a radio frequency (RF) based communication system 10 that provides the capability to automatically identify motor vehicles, determine motor vehicle location, speed and direction, and exchange data with motor vehicles is illustrated. The system 10 includes a transceiver probe device 14 and a smart tag transponder device 12 that is adhered to a vehicle license plate 20 or to some other component of a vehicle 22 suitable for displaying vehicle registration information. More particularly, the probe device 14 transmits a coded request signal 24 which is an RF signal pulse modulated with packetized data (described below) to all smart tag devices 12 located within approximately 500 ft of the probe device 14 and awaits a response. Upon receiving the coded RF request signal 24 from the probe device 14, the smart tag device 12 transmits a corresponding RF response signal 26 of its own. The response signal 26 may be used to identify or locate the vehicle 22 or exchange data between the probe device 14 and the vehicle 22 on which the smart tag device 12 is located.

To mitigate inadvertent jamming from multiple smart tag devices 12 responding to the probe device 14 at the same time, the coded response signal 26 of each tag 12 may be coded using a spread spectrum format such as code division multiple access (CDMA). This allows the requesting probe device 14 to distinguish between the responses 26 coming from each of the multiple tag devices 12 while achieving a range accuracy based on a spread spectrum modulation rate that is normally high. Thus, for purposes of illustration only, assuming a maximum of approximately twenty tag devices 12 located in the vicinity of the requesting probe device 14 and a spreading frequency that is 500 times higher than the data rate. The system 10 has the ability to separate each of the twenty responses 26 of the tag devices 12 while still achieving excellent signal-to-noise ratio for any individual tag response 26. Alternatively, if such ranging is not required, the probe device 14 may overcome inadvertent jamming by sending its coded request signals 24 at pseudo random intervals. For example, one inquiry per every $1/1000$ of a second, totaling no more than $5/1000$ of any one second.

Figure 2:
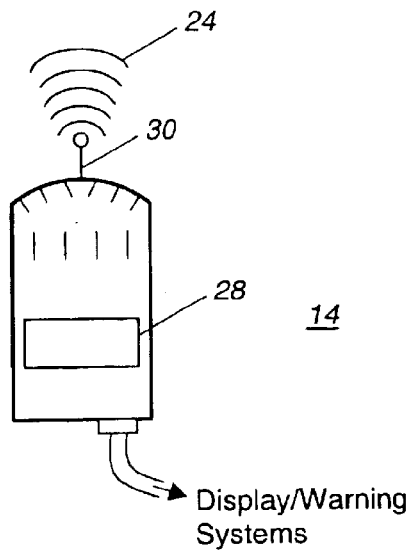
FIG. 2 is a functional diagram of an embodiment of a probe transceiver device in accordance with the present invention.

Referring now to FIG. 2, the probe device 14 is illustrated in accordance with a preferred embodiment of the present invention. The probe device 14 includes radio frequency (RF) and signal processing circuitry 28 and an antenna 30 for transmitting a coded request signal 24 to a smart tag device 12 (not shown). The coded request signal 24 contains data that is necessary to facilitate communication between the probe device 14 and the smart tag device 12. The data contained in the request signal 24 is set up by the signal processing circuitry 28 of the probe device 14 in a frame (packet). For purposes of illustration we will restrict our attention to the single-frame (i.e., single-packet) case, however the probe device 14 may send both single-frame and multi-frame (i.e., multi-packet) request signals 24 to the smart tag device 12. A single request packet (not shown) of the signal 24 preferably contains a header field and various other data fields that may be required depending on the needs of the particular system 10. For example, the header field of the single-packet may include a synchronization character that serves to define the start of the frame for the receiving smart tag device 12. Other data fields may include acknowledgement (ACK) and identification (ID) fields. The ACK field may contain an identification code character that uniquely identifies the coded request signal 24 as originating from a particular probe device 14. The ID field may contain a vehicle identification code (VIC) character that is associated only with a particular vehicle that the probe device 14 may be attempting to locate. Alternatively, the ID field may contain a VIC character that is common to all vehicles and acts as a "calling all vehicles" code so that the smart tag devices 12 receiving the request signal 24 carrying the common code can respond with information such as a license plate number. Still other data fields of the packet may include information that the probe device 14 is attempting to store with a particular smart tag device 12. In any case, it is important to note that the present invention is not limited to a particular packet format.

The probe device 14 can be a stationary or a mobile device depending on the requirements of the particular system 10. For example, a stationary probe device 14 may be embedded in the pavement or mounted to a structure located near a roadside. A mobile probe device 14 might be mounted on a moving vehicle and the smart tag devices 12 placed in stationary locations. For example, a municipal vehicle carrying a probe device 14 may query smart tag devices 12 that are fixed to stationary structures that require maintenance. For example, bridges whose strain must be monitored or wires embedded in pavement whose condition must be monitored due to weather expansion which can cause breaks in the wire.

Figure 3A:
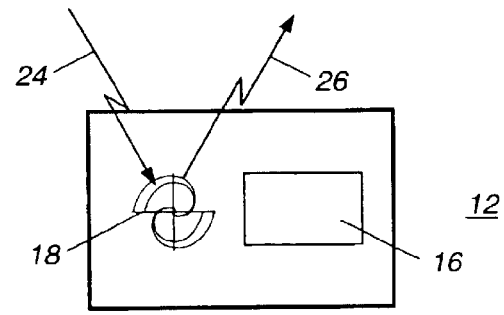
FIG. 3a is a functional diagram of an embodiment of a smart tag transponder device in accordance with the present invention.

Referring now to FIG. 3a, the smart tag device 12 is illustrated in accordance with a preferred embodiment of the present invention. The smart tag device 12 includes transceiving circuitry 16 and an omni-directional antenna 18. The smart tag device 12 can be implemented as either an active or a passive device depending on the transceiving circuitry 16 of the smart tag device 12.

Figure 3B:
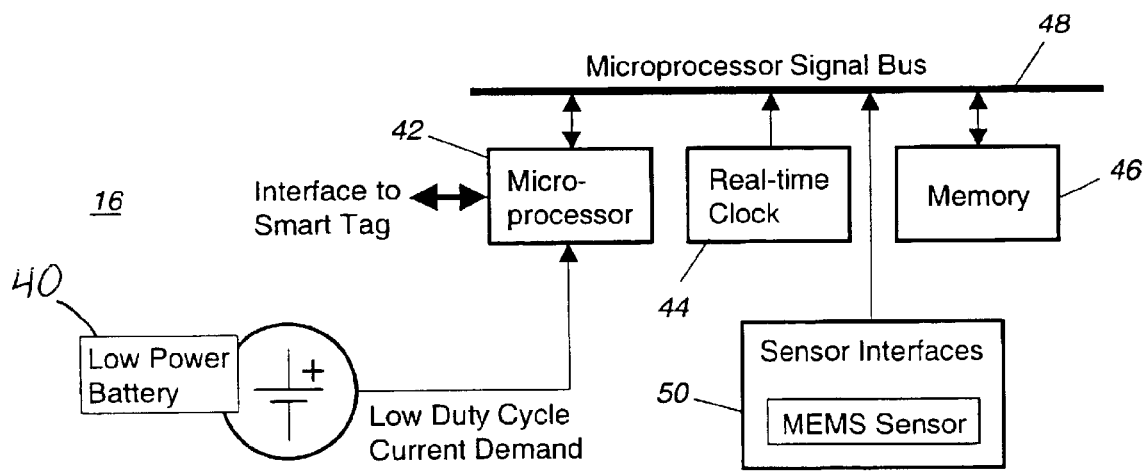
FIG. 3b is a functional diagram of the active transceiving circuitry of the smart tag transponder device of FIG. 3a in accordance with an embodiment of the present invention.

As shown in FIG. 3b, in one embodiment of the present invention, the transceiving circuitry 16 of an active smart tag device 12 preferably is active low duty cycle micropower monolithic integrated circuitry (MMIC) that generally includes a low-power battery 40 which powers a microprocessor unit 42. Additionally, the active circuitry 16 of the smart tag device 12 may include a real time clock 44 and a memory device 46 which each are connected to the microprocessor unit 42 along a signal bus 48 to allow the tag device 12 to store data from past probe 14 inquiries. The active tag device 12 may also include simple sensors 50, such as micro electro mechanical system (MEMS) accelerometers, that are also connected to the microprocessor unit along the signal bus 48 and measure the axial acceleration of the vehicle.

The microprocessor unit 42 of the active transceiving circuitry 16 allows the active smart tag device 12, upon receiving a coded RF request signal 24 from the probe device 14, to choose whether to respond to the coded RF request signal 24 based on the data contained in the request signal 24. In other words, the microprocessor unit may determine whether the coded probe request signal 24 is intended for another vehicle and choose not to respond. This is possible since the active smart tag device 12 is unique and thus either directly carries information unique to the vehicle 22 (see FIG. 1) or serves as a unique address pointer to a record that can be automatically extracted from a Department of Motor Vehicle (DMV) database or similar database system. However, once the active smart tag device 12 determines that it will respond to the probe device's 14 coded request signal 24, the active smart tag device 12 transmits it owns coded response signal 26 which is an RF signal pulse that is modulated with certain response data. Similar to the data contained in the request signal 24 of the probe device 14, the data contained in the response signal 26 of the smart tag device 12 is formatted within a single or multiple response packets (not shown), each packet having a header field and various other data fields depending on the needs of the particular system 10. For example, the header field of the response packet may include a synchronization character that serves to define the start of the frame for the receiving probe device 14. Other data fields may include acknowledgement (ACK) and identification (ID) fields. The ACK field may contain a probe identification code character that uniquely identifies the prove device 14 to which the smart tag device 12 is responding. The ID field may contain a vehicle identification code (VIC) character that uniquely identifies the vehicle for which the smart tag device 12 is responding. This vehicle identification code may either directly carry information unique to the vehicle (e.g. license plate number or vehicle identification number) or may serve as a unique address pointer to a record that can be automatically extracted from a Department of Motor Vehicle (DMV) database or similar database by a user of the probe device 14. Still other data fields of the response packet may include fields containing vehicle weight, vehicle make, vehicle acceleration (as determined by the accelerometers previously mentioned) or any other identifying information. Again, it is important to note that the present invention is not limited to any particular packet format.

In an alternate embodiment of the present invention, a passive smart tag device 12 is provided using passive transceiving circuitry 16. The passive circuitry 16 preferably may include known digitally controlled integrated circuitry, surface acoustic wave (SAW) coded delay line filters, such as those described by Reindl et al. in the publication "Programmable Reflectors for SAW ID-Tags", proc. IEEE Ultrasonics Symposium, 1993, pp. 125–30, and non-linear elements with resonant antennas that respectively generate and retransmit harmonic energy, such as those described in U.S. Pat. Nos. 4,799,045 and 4,779,076. However, unlike the active transceiving circuitry 16 of the active smart tag device 12, here, the passive transceiving circuitry 16 generally does not have the capability to selectively respond to coded request signals 24 that are transmitted by the probe device 14. Instead, upon receipt of a coded request signal 24 from the probe device 14, the transceiving circuitry 16 of the passive smart tag device 12 emits a strong radio signal pulse 26 only when the code modulated within the request signal 24 of the probe device 14 matches a fixed code that is contained within the circuitry 16. Otherwise, the circuitry 16 emits only a very weak radio signal pulse 26 that cannot be detected by the probe device 14. An advantage of the passive smart tag device 12 is that it does not require an independent source of battery power like that required by the active embodiment of the smart tag device 12. However, the passive smart tag device 12, unlike the active smart tag device, does not have the capability to store additional information beyond the information contained in its fixed codes.

Figure 4:
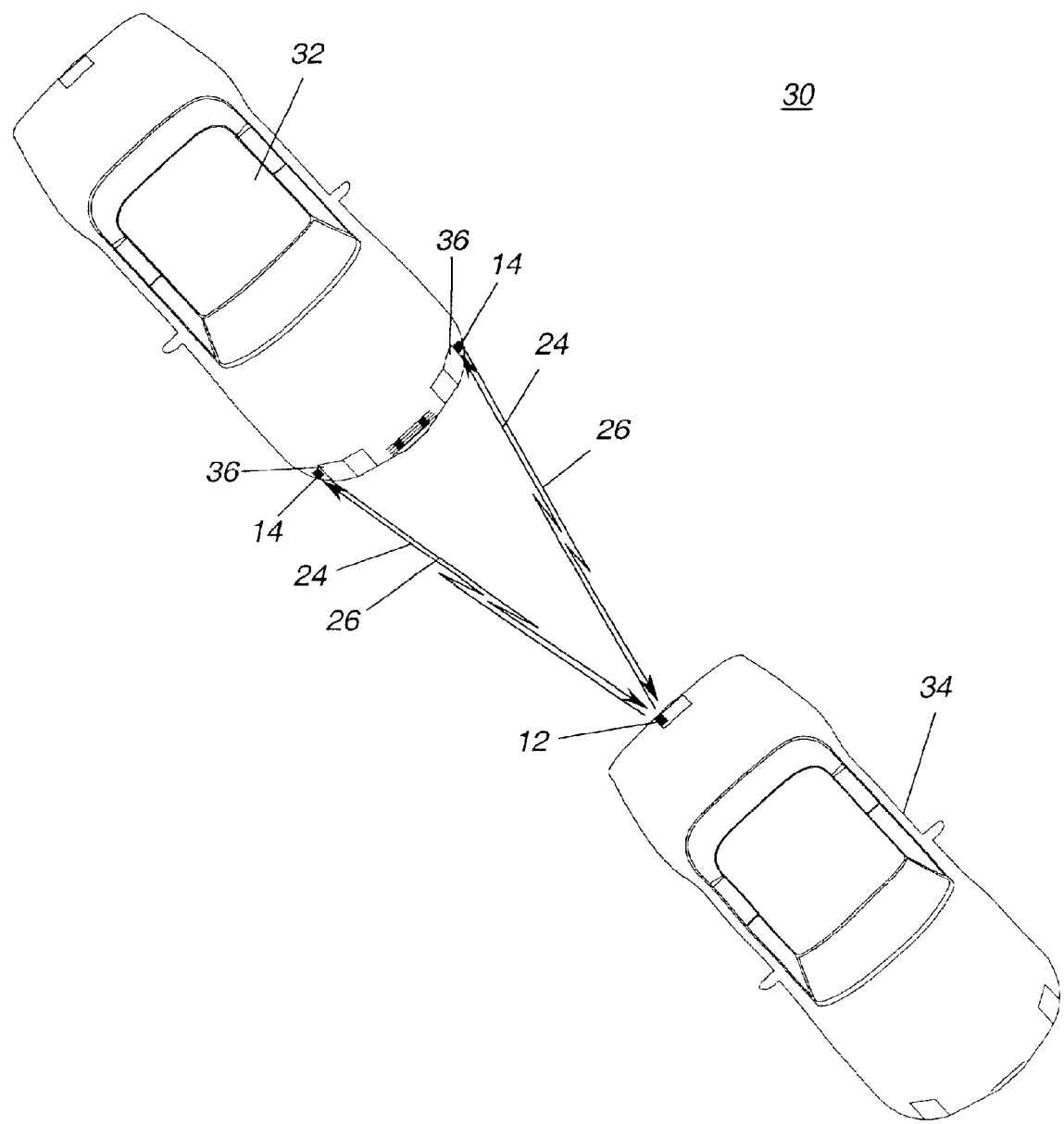
FIG. 4 is a top perspective view of a collision warning system in accordance with an embodiment of the present invention.

Referring to FIG. 4, in accordance with the advantages of the present invention, the principles of the present invention can be adapted for use in a forward collision warning system 30. For example, by locating at least two probe devices 14 at opposite ends of the front of a vehicle 32, preferably near the headlamps 36, each probe device 14 could independently query the smart tag devices 12 located on other surrounding vehicles 34 in the manner previously described and illustrated in FIGS. 1–3. And depending on the different time delays of the response signals 26 of each vehicle's 34 smart tag device 12 to the inquiring probe devices 14, a central processor (not shown) contained within the vehicle 32 could easily determine the relative location of the vehicles 34 hosting the responding tag devices 12 using known triangulation techniques. Moreover, by simultaneously tracking the vehicles 34 it can be determined which vehicles 34 constitute a danger due to fast closure. And because all vehicles 34 within a given state will be instrumented with these tags 12 consistent with yearly mandated registration requirements, it is possible to have a low cost, effective adaptive cruise control product.

Thus, the smart tag communication system 10 described herein provides significant benefits for the implementation of a wide range of Intelligent Transportation System (ITS) functions. Moreover, in order for the functions of an intelligent transportation infrastructure to be fully implemented, it is necessary that every vehicle have vehicle-based equipment that is compatible with the sensor and communication systems used within the ITS infrastructure. Based on the teachings of the present invention, this is made possible by integrating the state of the art in microelectronics and wireless technology with existing administrative and statutory requirements for vehicle license registration. The present invention replaces conventional adhesive proof-of-registration license plate tags with adhesive smart tags that include low cost radio transponders. These smart tags can be distributed to all vehicle owners and replaced yearly by mandate of existing law. Using such an approach, the present invention facilitates a relatively short time, approximately one-year, in which to install equipment on a high percentage of the population of vehicles on the road, and also facilitates a built-in maintenance and equipment upgrade/replacement schedule that occurs during yearly tag replacement cycles.

Additionally, the present invention can provide functions in an ITS or similar system that include vehicle identification for purposes of automatically determining whether the registration of a particular vehicle is current and whether the vehicle is listed for past traffic warrants; determining the location, speed and direction of specific vehicles; providing access at non-stop toll booths or pay-per-use express traffic lanes; and providing vehicle-to-vehicle sensing or communication to aid in minimum safe distance warning systems, low-speed traffic active cruise control systems, convoy braking and acceleration pre-notification systems.

Finally, due to the low cost of microelectronic chips and other existing active and passive RF transponder technologies, the present invention enables many of the functions described above to be implemented while keeping the cost of the vehicle-based equipment at a minimum—for example, only a few dollars per vehicle per year is added to the cost of a yearly registration sticker.

Obviously, many modifications and variations of the present invention are possible in light of the above teachings. Thus, it is to be understood that, within the scope of the appended claims, the invention may be practiced otherwise than as specifically described above.

What is claimed is:

1. A communication system, comprising:
   a first vehicle;
   a first probe located on the first vehicle, the first probe transmitting a first modulated radio frequency request signal and receiving a first modulated radio frequency response signal in response thereto;
   a second probe located on the first vehicle, the second probe transmitting a second modulated radio frequency request signal and receiving a second modulated radio frequency response signal in response thereto;
   a second vehicle spaced from the first vehicle;
   a tag attached to the second vehicle, the tag displaying a registration of the second vehicle, receiving the first modulated radio frequency request signal and the second modulated radio frequency request signal, transmitting the first modulated radio frequency response signal in response to the first modulated radio frequency request signal, and transmitting the second modulated radio frequency response signal in response to the second modulated radio frequency request signal, the first and second modulated radio frequency response signals each having a transmission delay; and
   a processor unit connected to the first and the second probe, the processor unit determining a location of the first vehicle relative to the second vehicle using the transmission delay of each of the first and second radio frequency modulated response signals.

2. A communication system, comprising:
   a probe for transmitting a modulated radio frequency request signal and for receiving a modulated radio frequency response signal, the request signal including an identification code;
   a vehicle spaced from the probe; and
   a tag adapted to be attached to the vehicle and including a registration of the vehicle, the tag receiving the request signal transmitted by the probe and including means for analyzing the identification code received in the request signal to determine whether the tag is an intended recipient of the request signal, the tag being effectively non-responsive to the request signal when the means for analyzing determines that the tag is not the intended recipient and transmitting the response signal when the means for analyzing determines that the tag is the intended recipient of the request signal.

3. A system as recited in claim 2, wherein the tag includes transceiving circuitry for receiving the request signal and transmitting the response signal corresponding thereto, the tag further comprising a low power battery for powering the transceiving circuitry, and the tag also including means for adhering to a component of the vehicle.

4. A system as recited in claim 3, wherein the vehicle component is a vehicle license plate.

5. A system as recited in claim 2, wherein the registration of the vehicle is a renewable state department of motor vehicle registration.

6. A system as recited in claim 3, wherein the transceiving circuitry is a low duty cycle micropower monolithic microwave integrated circuitry (MMIC).

7. A system as recited in claim 6, wherein the low duty cycle micropower monolithic microwave integrated circuitry (MMIC) comprises a microprocessor unit.

8. A system as recited in claim 6, wherein the low duty cycle micropower monolithic microwave integrated circuitry (MMIC) further comprises a real time clock.

9. A system as recited in claim 6, wherein the low duty cycle micropower monolithic microwave integrated circuitry (MMIC) further comprises a memory device.

10. A system as recited in claim 3, wherein the transceiving circuitry is digitally controlled integrated circuitry.

11. A system as recited in claim 3, wherein the transceiving circuitry is surface acoustic wave (SAW) coded delay line filter circuitry.

12. A system as recited in claim 3, wherein the transceiving circuitry is a non-linear element having a resonant antenna for generating and retransmitting harmonic energy.

13. A system as recited in claim 2, wherein the tag comprises an omni-directional antenna for receiving the modulated radio frequency request signal and transmitting the modulated radio frequency response signal.

14. A system as recited in claim 2, wherein the tag further comprises a sensor for measuring an axial acceleration of the vehicle.

15. A system as recited in claim 14, wherein the sensor is a micro electro mechanical system (MEMS) accelerometer.

16. A system as recited in claim 2, wherein the probe comprises radio frequency and signal processing circuitry for generating the modulated radio frequency request signal and processing the modulated radio frequency response signal.

17. A system as recited in claim 2, wherein the probe comprises an antenna for transmitting the modulated radio frequency request signal and receiving the modulated radio frequency response signal.

18. A system as recited in claim 2, wherein the probe is mobile.

19. A system as recited in claim 2, wherein the probe is stationary.

20. A system as recited in claim 2, wherein the modulated radio frequency response signal is modulated with data containing an identification of the vehicle.

21. A system as recited in claim 2, wherein the modulated radio frequency response signal is modulated with data for determining a location, a speed and a direction of the vehicle.

* * * * *